США010781936B2

(12) United States Patent
Ramsperger et al.

(10) Patent No.: US 10,781,936 B2
(45) Date of Patent: Sep. 22, 2020

(54) VALVE FOR CONTROLLING A FLUID FLOW

(71) Applicant: Eugen Seitz AG, Wetzikon (CH)

(72) Inventors: Marcel Ramsperger, Wetzikon (CH); Guenter Morawietz, Uster (CH)

(73) Assignee: Eugen Seitz AG, Wetzikon (CH)

( * ) Notice: Subject to any disclaimer, the term of this patent is extended or adjusted under 35 U.S.C. 154(b) by 16 days.

(21) Appl. No.: 15/564,496

(22) PCT Filed: Apr. 8, 2016

(86) PCT No.: PCT/CH2016/000057
§ 371 (c)(1),
(2) Date: Oct. 5, 2017

(87) PCT Pub. No.: WO2016/161529
PCT Pub. Date: Oct. 13, 2016

(65) Prior Publication Data
US 2018/0073658 A1 Mar. 15, 2018

(30) Foreign Application Priority Data
Apr. 10, 2015 (EP) ..................................... 15405028

(51) Int. Cl.
*F16K 31/06* (2006.01)
*F02M 21/02* (2006.01)
(Continued)

(52) U.S. Cl.
CPC ..... *F16K 31/0693* (2013.01); *F02M 21/0254* (2013.01); *F02M 21/0266* (2013.01);
(Continued)

(58) Field of Classification Search
CPC ............... F16K 31/0693; F16K 31/082; F16K 31/0651; F16K 31/0655; F02M 51/0689;
(Continued)

(56) References Cited

U.S. PATENT DOCUMENTS 5,398,724 A * 3/1995 Vars ........................ F02D 41/20
123/490
6,129,115 A * 10/2000 Janssen ............... F15B 13/0405
137/625.65
(Continued)

FOREIGN PATENT DOCUMENTS

AT 412 227 B 11/2004
DE 103 19 920 A1 5/2004
(Continued)

OTHER PUBLICATIONS

International Search Report of PCT/CH2016/000057, dated Jul. 6, 2016.

*Primary Examiner* — Craig J Price
*Assistant Examiner* — Andrew J Rost
(74) *Attorney, Agent, or Firm* — Collard & Roe, P.C.

(57) ABSTRACT

A valve has a valve housing in which a closure element having at least one sleeve section is movable along its sleeve longitudinal axis by an actuator to open and close a fluid connection between a fluid inlet and outlet. The actuator has stationary and movable parts relative to the valve housing. At least the movable parts and the closure element are arranged entirely within an enclosed fluid space between the fluid inlet and outlet. To close the fluid connection spaced first and second seal devices of a double-sealed seat are in sealing contact with equally-spaced first and second counter-seal devices on the valve housing along first and second closed seating lines, respectively. With regard to the at least one double-seal seat, the ratio between first and second areas enclosed by first and second sealing lines in projection along the sleeve longitudinal axis, respectively, is between 6/10 and 10/6.

23 Claims, 4 Drawing Sheets

Figure 1:
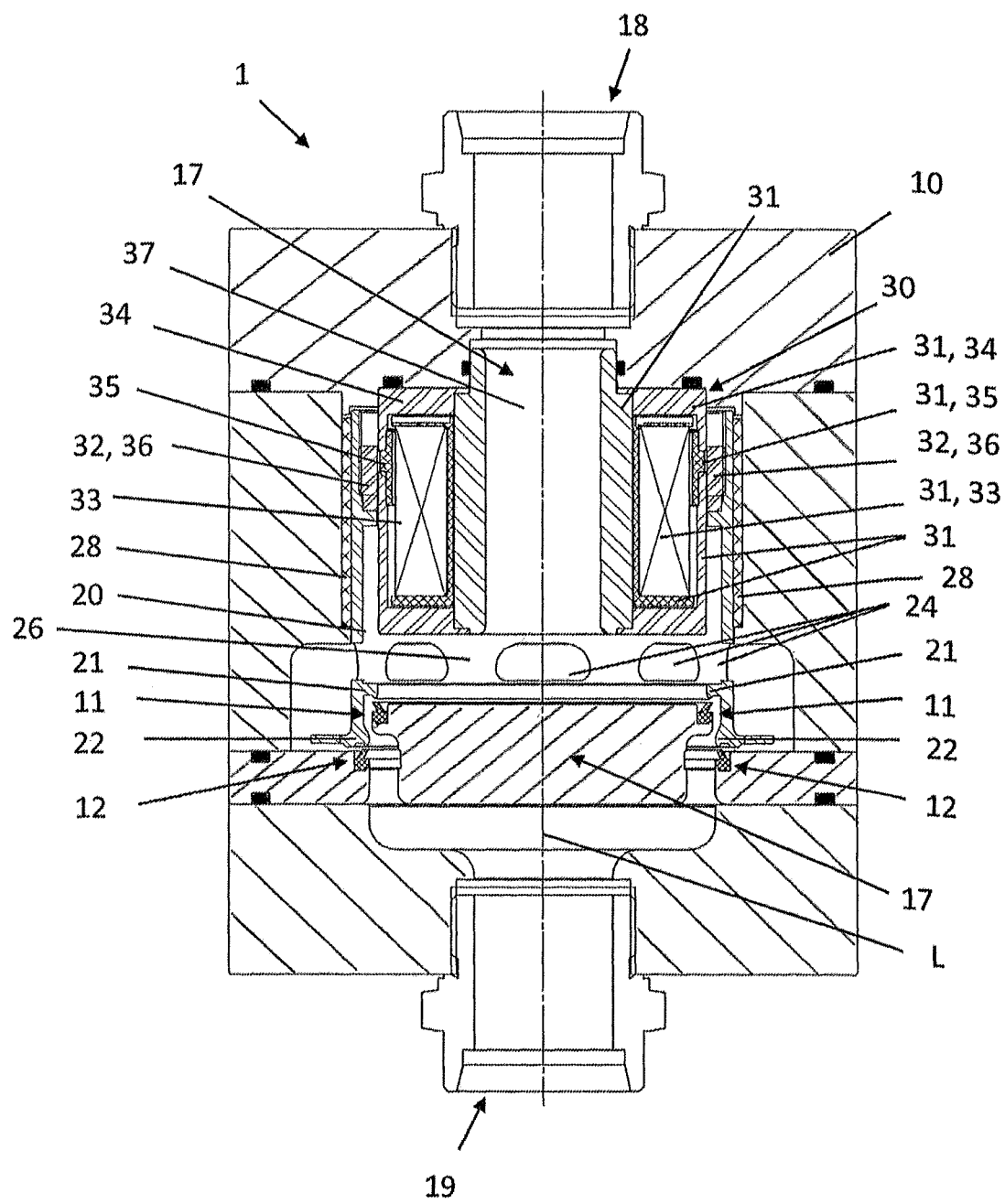

(51) Int. Cl.
  *F02M 51/06* (2006.01)
  *F16K 31/08* (2006.01)
(52) U.S. Cl.
  CPC ..... *F02M 51/0689* (2013.01); *F16K 31/0651* (2013.01); *F16K 31/0655* (2013.01); *F16K 31/082* (2013.01); *F02M 2200/08* (2013.01); *F02M 2200/16* (2013.01); *Y02E 20/14* (2013.01); *Y02T 10/32* (2013.01)
(58) Field of Classification Search
  CPC ........... F02M 21/0266; F02M 21/0254; F02M 2200/16; F02M 2200/08; Y02E 20/14; Y02T 10/32
  See application file for complete search history.

(56) References Cited

U.S. PATENT DOCUMENTS

| | | | |
|---|---|---|---|
| 7,347,221 B2 * | 3/2008 | Berger | .................... F16K 1/443 |
| | | | 137/614.18 |
| 9,828,957 B2 * | 11/2017 | Fujino | ................ F02M 51/0664 |
| 2011/0168931 A1 | 7/2011 | Sugiura et al. | |
| 2012/0115060 A1 | 5/2012 | Stier et al. | |
| 2013/0082126 A1 | 4/2013 | Fujita | |
| 2014/0224903 A1 | 8/2014 | Fujino et al. | |
| 2014/0231693 A1 * | 8/2014 | Terashima | .............. F16K 25/00 |
| | | | 251/333 |

FOREIGN PATENT DOCUMENTS

| | | |
|---|---|---|
| DE | 10 2013 202599 A1 | 8/2014 |
| EP | 1 870 620 A1 | 12/2007 |
| EP | 2 857 668 A1 | 4/2015 |

* cited by examiner

VALVE FOR CONTROLLING A FLUID FLOW

CROSS REFERENCE TO RELATED APPLICATIONS

This application is the National Stage of PCT/CH2016/000057 filed on Apr. 8, 2016, which claims priority under 35 U.S.C. § 119 of European Application No. 15405028.0 filed on Apr. 10, 2015, the disclosure of which is incorporated by reference. The international application under PCT article 21(2) was not published in English.

The invention relates to a valve for controlling a fluid flow, in particular a gas injection valve, which is at least partially, preferably completely pressure-compensated.

Such valves are used inter alia as gas injection valves to control the injecting of a fuel gas, which is under a first pressure, into an air flow, which is under a second, lower, pressure, which together with the injected fuel gas is subsequently delivered to the combustion chamber of an internal combustion engine. In order to enable a quick and precise control of the gas flow, such valves must be able to be switched very quickly between a closed position and an open position. This can be achieved on the one hand by a fast-switching drive or respectively actuator. On the other hand, an attempt can be made to construct the valve so that the drive must apply as small a force as possible in order to switch the valve closure to and fro against the pressure acting on it. For this, so-called pressure-equalized or respectively at least partially pressure-compensated valves are known from the prior art, in which the valve closure is designed in such a way that at least in one valve position—in most cases in the closed position—the sum of all forces which are exerted by the gases of both pressure sides onto the valve closure along its movement axis are compensated entirely or partially. In known pressure-compensated valves, for this purpose generally a first and a second sealing means come into use, which seal the valve closure at two different locations with respect to the valve housing. Thus, for example, the first sealing means can comprise a seal device on the valve housing, which in the closed position is in sealing contact with a corresponding counter-seal device of the valve closure. The second sealing means additionally seals the valve closure with respect to the valve housing such that the space in the interior of the valve housing in closed position of the valve is divided by the valve closure and the second sealing means into two chambers which are separated from one another, wherein the forces respectively in both chambers exerted by the fluid onto the valve closure, which forces act in the direction of the closed position, are counter-compensated entirely or at least partially by the forces which act in the direction of the open position.

Such a pressure-compensated valve is known for example from WO 2009/152414. In this valve, the second sealing means is formed by a flexible membrane, which is stretched between the valve closure and the valve housing. An alternative for the second sealing means consists in the use of a so-called dynamic seal, for instance an O-ring which, on a movement of the valve closure, slides on the valve closure or on the valve housing. Such flexible membranes or respectively dynamic seals have the disadvantage, however, that on the one hand they only have a short lifespan and on the other hand they complicate the production of the valve.

Furthermore, from DE 10 2013 202 599 A1 a magnetically actuatable gas injection valve is known, which has a first and a second valve seat. The two sealing areas/seats are separated from one another with regard to the two respective sealing surfaces by a shoulder running in actuation direction. In particular, this document discloses a sealing element of a valve, in particular of a gas valve, for controlling a medium, comprising a base body with a sealing surface, wherein the base body has a first sealing region and a second sealing region spaced apart from the first sealing region, wherein a first thickness of the sealing element on the first sealing region is different from a second thickness on the second sealing region, and wherein the first sealing region is separated from the second sealing region by a shoulder.

US 2014/0224903 A1 discloses a fuel injector, which has a nozzle element with a fuel passage, which leads to an injection connection. A valve main body is adapted to move to and fro, in order to open and close the fuel passage. An elastic section is deformable elastically by means of a movement of the valve main body in a closing direction on closing of the fuel passage, wherein the elastic element is mounted on the nozzle element or on the valve main body and is adapted to lie against the other of the nozzle element and the valve main body, in order to close the fuel passage by moving of the valve main body in the closing direction. A stopper is adapted to limit a movement of the valve main body 51 in the closing direction, by being applied against the valve main body, wherein the stopper is formed from a different material from the nozzle element.

It is therefore an object of the invention to indicate an improved, at least partially, preferably completely pressure-compensated valve, which does without flexible membranes or dynamic seals and, at the same time, permits a reliable and rapid controlling of a fluid flow as far as possible independently of the fluid pressures applied on the inlet- and outlet side.

This problem is solved by a valve according to claim 1. Advantageous embodiments of the invention are the subject of the dependent claims.

According to the invention, the valve has a valve housing, in which for opening and closing a fluid connection between a fluid inlet and a fluid outlet of the valve housing, a closure element having a sleeve section can be moved along its sleeve longitudinal axis by means of an actuator between an open position and a closed position.

The actuator has parts that are on the one hand stationary and on the other hand movable with respect to the valve housing, wherein the movable parts, for moving the closure element, can engage thereon in a force-fitting manner. According to the invention, provision is made that at least the movable parts of the actuator and the closure element are arranged entirely within a fluid space, enclosed by the valve housing, between the fluid inlet and the fluid outlet. With an opened fluid connection or respectively in open position of the valve, therefore all the surfaces of the closure element and of the moving parts in a single fluid space are arranged between the fluid inlet and the fluid outlet. Hereby, the use of dynamic seals is avoided, which would otherwise be necessary, in order to transfer the actuator forces, to be exerted on the closure element, via a possible dynamic-mechanical implementing means from outside the valve housing into the fluid space within the valve housing, for instance by a piston rod, which is guided in a dynamically sealed manner through the valve housing. In so far as the stationary parts are arranged outside the fluid space, electromagnetic actuators are particularly suitable which allow the actuator forces, which are to be exerted, to be transferred via a magnetic field in a manner unlinked to media from outside the valve housing into the fluid space within the valve housing. However, it is also conceivable that the stationary parts are likewise arranged entirely within the fluid space between fluid inlet and fluid outlet. The wording "stationary parts" and "moving parts" of the actuator also comprise, according to the present invention, configuration forms in which the "stationary parts" and/or the "moving parts" have, in some circumstances, respectively also only one component or consist of one component.

The sleeve section requires in an advantageous manner on the one hand a reduced moved mass and, on the other hand, a small fluid resistance, which both have a positive effect on the switching times of the valve. The sleeve section is preferably constructed substantially in a hollow cylindrical shape or respectively round in cross-section. However, other cross-sectional shapes are also conceivable, for instance a rectangular, square or polygonal cross-section.

According to the invention, provision is made furthermore that the valve has at least one double-seal seat, which has on the sleeve section a first and a second seal device, spaced apart therefrom along the sleeve longitudinal axis, and on the valve housing a first and a second counter-seal device, accordingly spaced apart equally, wherein in order to close the fluid connection the first seal device is in sealing contact with the first counter-seal device along a first closed sealing line and the second seal device is in sealing contact with the second counter-seal device along a second closed sealing line. With closed fluid connection, i.e. in closed position of the valve, the first and second sealing line therefore divide the fluid space respectively into partial fluid spaces, connected directly with the fluid inlet and directly with the fluid outlet, so that at both sealing lines respectively on one side of the corresponding sealing contact a direct fluid connection exists to the fluid inlet, and on the other side of the corresponding sealing contact a direct fluid connection exists to the fluid outlet. Owing to the same axial distance between the first and second seal device or respectively first and second counter-seal device, the first and the second seal device come in contact simultaneously with the first or respectively second counter-seal device, so that after coming into contact, up to and in the final closed position respectively the same sealing/contact pressures or respectively sealing pressure/contact pressure conditions are present at the first and second seal-/counter-seal device pair or respectively first and second seal seat pair.

Here, the term "sealing line" is to be understood in the technical sense to mean that the sealing line can also have a certain finite width, so that the seal device and the corresponding counter-seal device, depending on configuration, can also be in sealing contact with one another in a laminar manner. Through the provision of the two seal- and counter-seal devices, the at least two sealing means are realized, which are necessary for an at least partial pressure compensation or respectively for a complete pressure equalization, wherein, however, none of the sealing means according to the invention is a dynamic seal.

The (identical) axial distance, with respect to the sleeve longitudinal axis, between the first and second seal- or respectively counter-seal device permits in an advantageous manner that the valve can be almost or even completely pressure-equalized, for which it is necessary that the first and second sealing line are arranged almost or even completely congruently over one another in a projection along the movement direction. In this case, the pressure-active effective area, onto which, with a closed valve, a possible pressure difference between fluid inlet and fluid outlet could exert an effective net force in the direction of closed position or open position, is very small or even zero. With arrangement of the closure element and at least all moving parts of the actuator within the fluid space—as provided according to the invention—the pressure-active effective area corresponds to the difference between, on the one hand, a first area which is enclosed by the first sealing line in projection along the sleeve longitudinal axis, and, on the other hand, a second area, which is enclosed by the second sealing line in projection along the sleeve longitudinal axis. Viewed alternatively, the pressure-active effective area with closed valve corresponds to the pressure-active area components of the closure element on the fluid inlet side effectively in the direction of the closed position, and the moving parts of the actuator minus the pressure-active area components of the closure element effectively in the direction of the open position, and of the moving parts of the actuator. With arrangement of the closure element and at least all moving parts of the actuator within the fluid space—as provided according to the invention—the same also applies on the fluid outlet side. Here, the "pressure-active area components in the direction of closed position or respectively in the direction of open position" means all the surfaces of the closure element which are able to be acted upon by pressure, or respectively the moving parts of the actuator which have an area component in the direction of the closed position or respectively open position.

According to the invention, provision is made in the sense of an at least partial or even complete pressure equilibrium, that with respect to the at least one double-seal seat, the ratio between the first area enclosed by the first sealing line in projection along the sleeve longitudinal axis, and the second area enclosed by the second sealing line in projection along the sleeve longitudinal axis is between 6/10 and 10/6. A ratio in this range brings it about, in an advantageous manner, that the switching of the valve can take place sufficiently quickly and precisely.

According to an advantageous configuration of the invention, provision is made that the valve has two, in particular three, in particular four, in particular five double-seal seats, which respectively on the sleeve section have a first and a second seal device, spaced apart therefrom along the sleeve longitudinal axis, and on the valve housing a first and a second counter-seal device, accordingly spaced apart. Through the presence of a plurality of double-seal seats, the through-flow cross-sectional area is enlarged in an advantageous manner with the same valve stroke.

According to a further advantageous configuration of the invention, provision is made that with respect to the at least one double-seal seat or respectively each double-seal seat, the ratio between the respectively first area and the respectively second area lies between 65/100 and 100/65, in particular between 7/10 and 10/7, in particular between 75/100 and 100/75, in particular between 8/10 and 10/8, in particular between 85/100 and 100/85, in particular between 9/10 and 10/9, in particular between 95/100 and 100/95, preferably is equal to 1. Hereby, the switching times can be improved still further and the fluid pressures, applied in a switching-time-dependent manner from the inlet and outlet side, can be further minimized. Complete pressure equilibrium is present when the first and second area are equal in size, in particular lie congruently over one another in axial direction or respectively in the direction of the sleeve longitudinal axis.

In several applications, an occasionally at least only partial to almost complete, but not entire pressure equilibrium can be sufficient, so that according to a further advantageous configuration of the invention, provision can be made that with respect to the at least one double-seal seat or respectively each double-seal seat, the ratio of the respectively first area to the respectively second area lies between 6/10 and 99/100 or between 100/99 and 10/6, in particular between 6/10 and 98/100 or between 100/98 and 10/6, in particular between 6/10 and 97/100 or between 100/97 and 10/6, in particular between 6/10 and 96/100 or between 100/96 and 10/6, in particular between 6/10 and 95/100 or between 100/95 and 10/6, in particular between 6/10 and 94/100 or between 100/94 and 10/6, in particular between 6/10 and 93/100 or between 100/93 and 10/6, in particular between 6/10 and 92/100 or between 100/92 and 10/6, in particular between 6/10 and 91/100 or between 100/91 and 10/6, in particular between 6/10 and 9/10 or between 10/9 and 10/6, in particular between 6/10 and 89/100 or between 100/89 and 10/6, in particular between 6/10 and 88/100 or between 100/88 and 10/6, in particular between 6/10 and 87/100 or between 100/87 and 10/6, in particular between 6/10 and 85/100 or between 100/85 and 10/6. It is also conceivable that at each of the previously indicated intervals in place of the lower limit of 6/10 or respectively the upper element 10/6, one of the following lower limits or respectively upper limits occurs: 65/100 or respectively 100/65 or 7/10 or respectively 10/7 or 75/100 or respectively 100/75 or 8/10 or respectively 10/8.

In order to further improve the switching characteristic of the valve, provision can be made according to an advantageous configuration of the invention that with respect to the at least one double-seal seat or respectively with respect to respectively each double-seal seat, the ratio of the smallest distance of the first or second seal device to the sleeve longitudinal axis and on the other hand to the axial distance between first and second seal device is at least 1, in particular at least 1.25, in particular at least 1.5, in particular at least 1.75, in particular at least 2, in particular at least 2.25, in particular at least 2.5, in particular at least 2.75, in particular at least 3, in particular at least 3.25, in particular at least 3.5, in particular at least 3.75, in particular at least 4, in particular at least 4.5, in particular at least 5, in particular at least 6, preferably at least 7. On the one hand, with an increasing distance of the seal devices to the sleeve longitudinal axis, the circumference of the sealing line increases, and thereby the through-flow cross-sectional area, with the same valve stroke, whereby, vice versa, with a predetermined through-flow cross-sectional area the valve stroke can be reduced. On the other hand, the length and therefore the mass of the closure element is reduced with a decreasing axial distance between first and second seal device.

Preferably, the opened fluid connection between fluid inlet and fluid outlet with respect to the at least one double-seal seat or respectively with respect to each respective double-seal seat at least in the region between respectively first and second seal device leads via an inner and an outer side of the sleeve section. Furthermore, provision can be made that the fluid, on opening of the valve, flows via both passages, which open between first or respectively second seal- and counter-seal device, so that in an advantageous manner already with a half stroke the same through-flow cross-sectional area opens as with corresponding single-seat valves, which has a positive effect on the switching times.

Furthermore, it is conceivable that
  the first and/or second seal device of the at least one double-seal seat is arranged on a circumferential extension on the circumferential side, on the outer side of the sleeve section, or
  the first and/or second seal device of the at least one double-seal seat is arranged on a circumferential extension on the circumferential side, on the inner side of the sleeve section, or
  one of the seal devices of the at least one double-seal seat is arranged on a circumferential extension on the circumferential side, on the outer side or inner side of the sleeve section, and the other seal device of the at least one double-seal seat is arranged on a face side of the sleeve section, or
  one of the seal devices of the at least one double-seal seat is arranged on a circumferential extension on the circumferential side, on the inner side of the sleeve section, and the other seal device of the at least one double-seal seat is arranged on a circumferential extension on the circumferential side, on the outer side of the sleeve section.

In particular when both seal devices of the at least one double-seal seat are arranged on a circumferential extension on the outer side or alternatively on the inner side, they can be arranged lying congruently over one another in the direction of the sleeve longitudinal axis, in order to achieve a complete pressure equilibrium.

For the case where the two sealing lines of the at least one double-seal seat lie congruently, over one another in a projection along the sleeve longitudinal axis, or at least intersect in the projection, provision can be made according to a further advantageous configuration of the invention that for the simple mounting of a correspondingly constructed closure element in the valve housing, the closure element, preferably in the region of the sleeve section, is constructed having several parts, in particular having two parts. Here, preferably the first and second seal device are respectively arranged on different parts of the multi-part closure element or respectively of the sleeve section. Alternatively or additionally, however, the valve housing can also be constructed having several parts, in particular having two parts, wherein preferably the first and second counter-seal device are arranged respectively on different parts of the multi-part valve housing. It is also conceivable that the valve housing has at least one mounting opening which is able to be closed in a sealing manner.

Conversely, however, in an only partially pressure-equalized valve in the sense of this invention, in which the two sealing lines of the at least one double-seal seat do not lie congruently over one another in a projection along the sleeve longitudinal axis and do not intersect in the projection along the sleeve longitudinal axis, provision can be made that the valve housing is constructed in one piece, at least in the region in which the first and second counter-seal devices are arranged, or that the closure element at least in the region of the sleeve section in which the first and second seal devices of the at least one double-seal seat are arranged, is constructed in one piece. Hereby, a very accurately fitting axial distance between first and second seal- or respectively counter-seal device can be guaranteed, which lies within the necessary tolerance limits for a sufficient sealing contact in closed position.

According to a further configuration of the invention, the closure element can have a further sleeve section axially adjoining the sleeve section, which further sleeve section preferably has at least one through-opening on the circumferential side, via which the inner side and the outer side of the further sleeve section are in fluid connection. Via such a through-opening it can be achieved inter alia that in the open position the fluid connection between fluid inlet and fluid outlet at least in the region between first and second seal device leads both via the inner side and also via the outer side of the closure element. It is also conceivable that the closure element as a whole is constructed as a sleeve, preferably substantially in the form of a hollow cylinder or respectively round in cross-section. However, other cross-sectional shapes are also conceivable, for instance a rectangular, square or polygonal cross-section. In addition, provision can be made that the sleeve section between the respectively adjacent double seal seats has at least one through-opening on the circumferential side, via which the inner side and the outer side of the sleeve section are in fluid connection.

According to an advantageous configuration of the invention, the actuator is constructed as an electromagnetic reluctance actuator, which has a magnetic field coil, a magnetically conductive body with air gap, for instance a soft iron body with air gap, and an armature. Alternatively, the actuator can also be constructed as an electromagnetic plunger coil actuator with a magnetic field coil and a permanent magnet. In a particularly simple manner, such electromagnetic actuators allow the actuator forces to be exerted on the closure element to be transferred from outside the valve housing into the fluid space within the valve housing without the use of a dynamic-mechanical through-going means and the use of any dynamic seals, so that it is possible to arrange only the moving part of the actuator in the fluid space.

In this respect, in an advantageous configuration of the invention provision can be made that with a construction of the actuator as a reluctance actuator, the armature is the moving part and is accordingly connected to the closure element, in particular is constructed in one piece with the closure element. In addition, it is conceivable that the armature is arranged either radially internally or radially externally with respect to the magnetic field coil and the body.

Accordingly, with a construction of the actuator as a plunger coil actuator, provision can be made that either the magnetic field coil as moving actuator part is connected to the closure element, in particular is wound onto a section of the closure element.

In addition, in a further configuration of the invention, both the moving and also the stationary part of the actuator can be arranged within the fluid space. Accordingly, in a further embodiment, provision is made that with a construction as reluctance actuator the magnetic field coil, the magnetically conductive body and the armature are arranged within the fluid space and that with a construction as plunger coil actuator the magnetic field coil and the permanent magnet are arranged within the fluid space.

In order to create a particularly space-saving valve, the fluid connection between fluid inlet or fluid outlet can lead in an advantageous manner through the centre of the magnetic field coil of the reluctance actuator or of the plunger coil actuator along the coil axis.

In further embodiments of the invention, provision can be made that the fluid inlet points axially or radially into the valve housing with respect to the sleeve longitudinal axis, and/or that the fluid outlet points axially or radially out from the valve housing with respect to the sleeve longitudinal axis. In particular, an axial-axial arrangement, in which both the fluid inlet and also the fluid outlet point axially into or respectively out from the valve housing with respect to the sleeve longitudinal axis, is distinguished by a fluid guidance which is particularly favourable with regard to flow.

According to a further configuration of the invention, the first and/or second seal device of the at least one double seal seat and/or the first and/or second counter-seal device of the at least one double-seal seat can have seals, for instance sealing rings. These can be produced for example from an elastic material, for instance from an elastomer.

To protect the first and second seal- and counter-seal devices of the at least one double-seal seat, in particular of the seals, when these come in sealing contact with one another in closed position, provision can be made additionally that the valve, preferably the closure element or respectively alternatively or additionally the valve housing, has at least one mechanical end stop. The seals can be additionally protected in an advantageous manner by arranging in a groove or groove-like depression, from which the seal only partially protrudes. Hereby, it is prevented that the entire kinetic energy of the closure element, on coming into sealing contact of counter-seal device and seal device, must be received completely by the seal- and counter-seal devices, in particular by the seal. Rather, the majority of the energy is received by the mechanical end stop, so that a long lifespan of the seal- and counter-seal devices, in particular of the seal, can be guaranteed.

According to a further advantageous configuration of the invention, the seal has a sealing lip, which is preferably aligned in flow direction of the fluid connection between fluid inlet and fluid outlet. In particular, the sealing lips of the seals on the first seal- or respectively counter-seal device of the at least one double-seal seat and the sealing lips of the seals on the second seal- or respectively counter-seal device of the at least one double-seal seat are aligned facing one another. Hereby, it can be achieved that the first and second sealing line in the projection along the sleeve longitudinal axis lie even closer together in radial direction, so that the pressure-active effective area is additionally reduced.

In addition to the use as gas injection valve in internal combustion engines, the previously described valve according to the invention is also suitable universally for other control processes of a fluid flow of gaseous and/or liquid media, in which on the one hand the switching characteristic is to be as independent as possible from possibly great pressure differences between inlet and outlet, and on the other hand long lifespans are to be guaranteed. Other areas of application concern for example the pre-chamber gas dosing in gas engines for combined heat and power plants or for ships. The use as stretch blow moulding valve, for instance for the production of PET (polyethylene terephthalate) bottles, is also conceivable.

Further aims, advantages and application possibilities of the present invention will emerge from the following description of an embodiment with the aid of the drawings.

Figure 2:
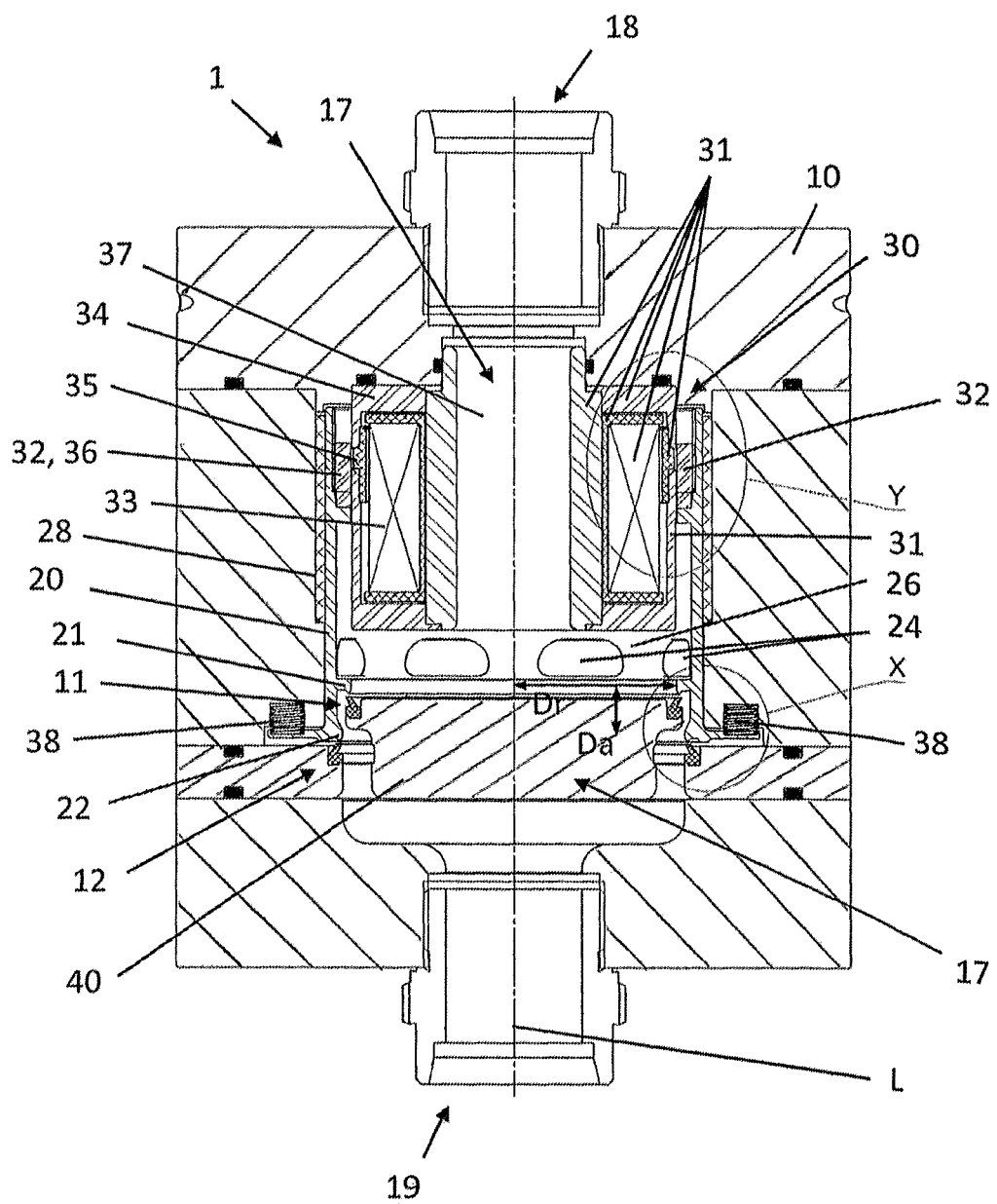
Figure 3:
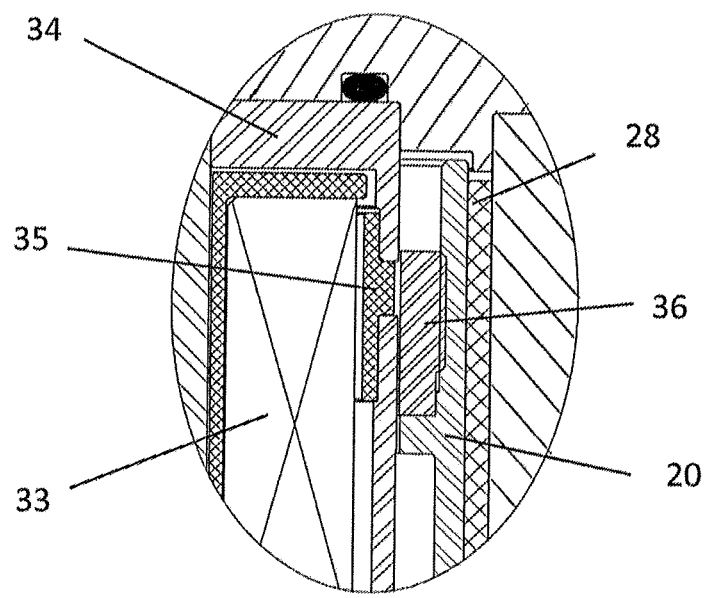
Figure 4:
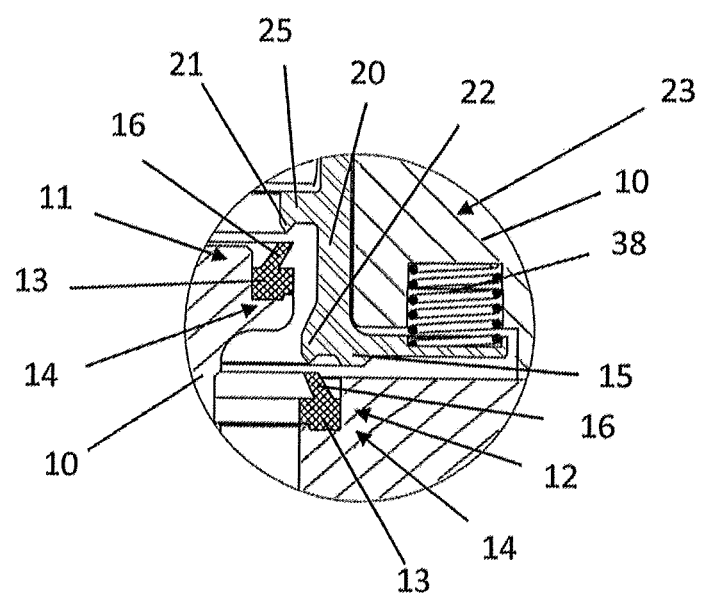
Figure 5:
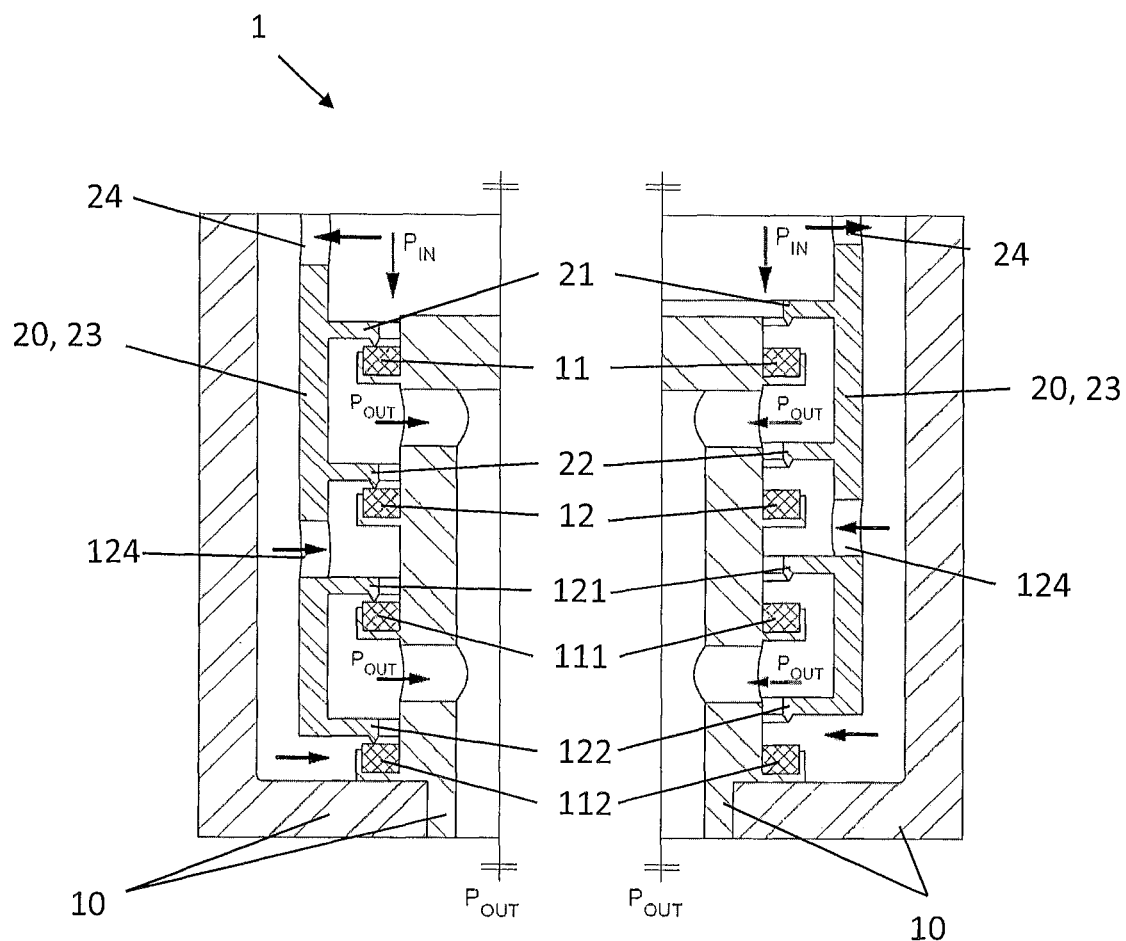

There are shown:

FIG. 1 cross-section through an embodiment of a valve according to the invention along a first section plane, FIG. 2 cross-section through the valve according to FIG. 1 along a second section plane, FIG. 3 detail view Y according to FIG. 2, FIG. 4 detail view X according to FIG. 2, and FIG. 5 detail cross-section through a further embodiment of a valve according to the invention.

FIGS. 1 to 4 show a possible embodiment of a valve 1 according to the invention. The valve 1 has a valve housing 10, in which for opening and closing a fluid connection between a fluid inlet 18 and a fluid outlet 19 of the valve housing 10 a substantially hollow-cylindrical closure element 20 with a sleeve section 23 and with a further sleeve section 26 is arranged so that it can be moved along the sleeve longitudinal axis L on slide bearings 28. An actuator 30 serves for moving the closure element 20 between the open position and the closed position of the valve 1, which actuator moves the closure element 20 into the closed position against the force of a plurality of circumferentially distributed return springs 38. FIGS. 1 to 4 show the valve 1 in the open position.

In the present embodiment, the actuator 30 is constructed as an electromagnetic reluctance actuator, which has a magnetic field coil 33, a magnetically conductive body 34 with air gap 35, and a magnetically conductive armature 36. Here, the magnetic field coil 33 and the magnetically conductive body 34 with air gap 35 are constructed as stationary parts 31 with respect to the valve housing 10, whereas the armature 36 is connected as movable part 32 securely to the movable closure element 20.

Both the closure element 20 and the armature 36 connected therewith, and also the magnetic field coil 33 and the magnetically conductive body 34 with air gap 35 are arranged entirely within a fluid space 17, enclosed by the valve housing 10, between fluid inlet 18 and fluid outlet 19. Thereby, at least all the movable parts, i.e. the movable parts 32 of the actuator 30 and the closure element 20 are enclosed within the fluid space 17, so that dynamic seals and the disadvantages entailed therewith are avoided. In the present embodiment, the closure element 20 and the armature 36 are arranged radially externally with respect to the magnetic field coil 33 and the body 34 and encompass the magnetic field coil 33 and the body 34.

The valve according to FIGS. 1 to 4 has a double-seal seat, which on the sleeve section 23 has a first seal device 21 and a second seal device 22 spaced apart therefrom along the sleeve longitudinal axis L, and has on the valve housing 10 a first and a second counter-seal device 11, 12 accordingly spaced apart. Here, for closing the fluid connection, the first seal device 21 with the first counter-seal device 11 along a first closed sealing line, and the second seal device with the second counter-seal device 12 along a second closed sealing line are in sealing contact such that the first and second sealing line divides the fluid space 17 respectively into partial fluid spaces directly connected to the fluid inlet 18 and directly connected to the fluid outlet 19, which means that on one side of the respective sealing contact a fluid connection exists to the fluid inlet 18, and on the other side of the respective sealing contact a fluid connection exists to the fluid outlet 19.

In order to utilize the advantages of the double-seal seat, i.e. to open the same through-flow cross-sectional area with a half stroke as with a corresponding single-seat valve, in the open position the fluid connection at least in the region of the sleeve section 23 between first and second seal device 21, 22 leads both via the inner side and also via the outer side of the closure element 20 or respectively of the sleeve section 23. For this, the further sleeve section 26 of the closure element 20 has a plurality of circumferential through-openings 24, via which the inner side and the outer side of the closure element 20 are in fluid connection. As can be seen in particular in FIG. 1, the valve housing 10 has, on the inner side in the region between first and second counter-seal device 11, 12, convexities in which the fluid can flow from the through-openings 24 on the outer side of the closure element 20 in the direction of the second counter-seal device 22.

As can be seen in particular in FIG. 4, the first seal device 21 is formed on a circumferential extension 25 on the inner side of the sleeve section 23, whereas the second seal device 22 is arranged on the face side of the sleeve section 23 on the fluid outlet side. In addition, the sleeve section 23 has on its face side on the fluid outlet side an extension, circumferential on the circumferential side, pointing radially outwards, on which the return springs 38 rest between the valve housing 10 and the closure element 20. In particular, the closure element 20 together with extensions and seal devices 21, 22 is constructed in one piece, whereby the valve becomes very low-tolerance. The corresponding second counter-seal device 12 is arranged on the inner wall of the valve housing 10, whereas the corresponding first counter-seal device 11 is arranged on an inner part 40 on the fluid outlet side, which inner part forms part of the valve housing 10 and is supported towards the exterior against the inner wall of the valve housing 10.

In the present embodiment, the first and second seal device 21, 22 have substantially blade-like sealing edges, whereas the first and second counter-seal device 11, 12 has respectively a circumferential seal 13 with sealing lips 16, which in closed position come into sealing contact with the blade-like sealing edges of the first and second seal device 21, 22. To protect the seals 13, the latter are arranged in grooves or respectively in groove-like depressions 14 on the first and second counter-seal device 11, 12, wherefrom the sealing lips 16 partially project in the direction of the open position. In addition, the closure element 20 has a mechanical end stop 15. As a whole, it is prevented hereby that the entire kinetic energy of the closure element 20 at the coming into sealing contact of seal- and counter-seal device 21, 22, 11, 12 must be completely received by the seals 13. Rather, the majority of the energy is received by the mechanical end stop 15, so that a long lifespan of the seals 13 can be guaranteed.

As the closure element 20 is constructed so as to be substantially hollow-cylindrical in the present embodiment, the first and second sealing line are respectively closed circular lines, along which the first or respectively second seal device 21, 22 are in sealing contact with the first or respectively second counter-seal device 11, 12 in closed position. As can be seen in particular from FIG. 4, the sealing lips 16 of the seals 13 are arranged facing one another on the first and second counter-seal device. Hereby, it is achieved that the first and second sealing line lie as close as possible to one another radially in a projection along the longitudinal axis, in order to configure the valve 1 according to the invention in an almost pressure-equalized manner. In the present embodiment, the ratio of the first area, which is enclosed by the first sealing line in projection along the sleeve longitudinal axis L, to the second area, which is enclosed by the second sealing line in projection along the sleeve longitudinal axis L, is approximately 89/100, which permits a sufficiently rapid and precise switching of the valve between closed and open position.

In addition, in the embodiment shown here, the ratio of the smallest distance Dr of the first seal device 21 to the sleeve longitudinal axis L to the axial distance Da lies between first and second seal device 21, 22, i.e. the ratio of the radius of the first sealing line to the axial distance Da, is more than 3.5. Hereby, on the one hand, in the open position an as large as possible through-flow cross-sectional area is produced between first or respectively second seal device 21, 22 and first or respectively second counter-seal device 11, 12, and on the other hand the length and thereby the mass of the closure element 20, and consequently the switching time, is reduced.

Furthermore, the fluid inlet 18 and the fluid outlet 19 point axially into or respectively out from the valve housing 10 with respect to the sleeve longitudinal axis L. This axial-axial arrangement is distinguished by a fluid guidance which is particularly favourable with regard to flow. The embodiment which is shown here presents in addition a particularly space-saving valve 1, because the fluid connection between fluid inlet 18 or fluid outlet 19 leads in an advantageous manner through the centre 37 of the magnetic field coil 33 of the reluctance actuator along the coil axis.

FIG. 5 shows a detail cross-section through a further embodiment of a valve 1 according to the invention in open position (right-hand partial illustration of FIG. 5) or respectively in closed position (left-hand partial illustration of FIG. 5), which in contrast to the embodiment according to FIGS. 1 to 4 has not only one, but two double-seal seats, which respectively on the sleeve section 23 have a first and a second seal device 21, 22 or respectively 121, 122 spaced apart therefrom along the sleeve longitudinal axis L, and on the valve housing 10 a first and a second counter-seal device 11, 12 or respectively 111, 112, accordingly spaced apart.

Here, the respective first and second seal devices 21, 22 or respectively 121, 122 and the respective first and second counter-seal devices 11, 12 or respectively 111, 112 of the two double-seal seats are constructed in an analogous manner to the first and second seal device 21, 22 and the first and second counter-seal device 11, 12 of the valve 1 according to FIGS. 1 to 4.

In order to direct the fluid flow via both double-seal seats with opened valve 1, the sleeve section 23 in valve 1 according to FIG. 5 has, in addition to the through-openings analogous to the valve 1 according to FIGS. 1 to 4, additionally between the second seal device 22 of the one double-seal seat and the first seal device 121 of the adjacent second double-seal seat at least one through-opening 124 on the circumferential side, via which the inner side and the outer side of the sleeve section 23 are in fluid connection.

Overall, with the valve 1 according to FIG. 5, compared to the valve 1 according to FIGS. 1 to 4, through the presence of a plurality of double-seal seats advantageously the through-flow cross-sectional area is increased with the same valve stroke.

In addition, the valve 1 according to FIG. 5, compared to the valve 1 according to FIGS. 1 to 4, is completely pressure-equalized, because respectively the first and second seal device 21, 22, 121, 122 or respectively counter-seal device 11, 12, 111, 112 of both double-seal seats lie over one another congruently, so that with respect to both double-seal seats the ratio of the respectively first area, which is enclosed by the respectively first sealing line in projection along the sleeve longitudinal axis L, to the respectively second area, which is enclosed by the respectively second sealing line in projection along the sleeve longitudinal axis L, amounts to 1. The same would of course also be conceivable for the valve 1 according to FIGS. 1 to 4.

The invention claimed is:

1. A valve comprising:
   (a) a closure element having at least one sleeve section, the at least one sleeve section having a longitudinal axis and the at least one sleeve section having a first seal device and a second seal device spaced at a first distance from the first seal device along the longitudinal axis;
   (b) a valve housing comprising a fluid inlet, a fluid outlet, and a fluid space enclosed between the fluid inlet and the fluid outlet, the valve housing comprising a first counter-seal device and a second counter-seal device spaced from the first counter-seal device by the first distance; and
   (c) an actuator, the actuator having stationary parts and movable parts with respect to the valve housing;
   wherein the closure element is movable along the longitudinal axis by the actuator to open and close a fluid connection between the fluid inlet and the fluid outlet;
   wherein at least the movable parts and the closure element are arranged entirely within the fluid space;
   wherein at least one double-seal seat is formed by the first seal device, the first counter-seal device, the second seal device, and the second counter-seal device;
   wherein in order to close the fluid connection, the first seal device is in sealing contact with the first counter-seal device along a first closed sealing line and the second seal device is in sealing contact with the second counter-seal device along a second closed sealing line;
   wherein a first area enclosed by the first closed sealing line in projection along the longitudinal axis and a second area enclosed by the second closed sealing line in projection along the longitudinal axis have a ratio between 6/10 and 10/6;
   wherein at least two devices of the group of the first seal device, the second seal device, the first counter-seal device and the second counter-seal device comprise a seal produced from an elastic material;
   wherein said two seals are independent components from each other; and
   wherein the valve further comprises at least one mechanical end stop for protection of the first seal device and the second seal device and the first counter-seal device and the second counter-seal device, when the first and second seal devices and the first and second counter-seal devices come in sealing contact with one another.

2. The valve according to claim 1, wherein the ratio is one of the following group: between 6/10 and 98/100, between 6/10 and 97/100, between 6/10 and 96/100, between 6/10 and 95/100, between 6/10 and 94/100, between 6/10 and 93/100, between 6/10 and 92/100, between 6/10 and 91/100, between 6/10 and 9/10, between 6/10 and 89/100, between 6/10 and 88/100, between 6/10 and 87/100, and between 6/10 and 85/100.

3. The valve according to claim 1, wherein the ratio is between 65/100 and 100/65.

4. The valve according to claim 3 wherein the ratio is one of the group of: between 7/10 and 10/7, between 75/100 and 100/75, between 8/10 and 10/8, between 85/100 and 100/85, between 9/10 and 10/9, between 95/100 and 100/95, and equal to 1.

5. The valve according to claim 1, wherein the fluid connection opened between the fluid inlet and the fluid outlet at least in a region between the first seal device and the second seal device goes via an inner side and an outer side of the sleeve section.

6. The valve according to claim 1, wherein a ratio between on the one hand the smallest distance of the first or second seal device to the longitudinal axis and on the other hand to an axial distance between the first seal device and the second seal device is at least 1.

7. The valve according to claim 6 wherein the ratio between on the one hand the smallest distance of the first or second seal device to the longitudinal axis and on the other hand to the axial distance between the first seal device and the second seal device is one of the group of: at least 1.25, at least 1.5, at least 1.75, at least 2, at least 2.25, at least 2.5, at least 2.75, at least 3, at least 3.25, at least 3.5, at least 3.75, at least 4, at least 4.5, at least 5, at least 6, and at least 7.

8. The valve according to claim 1, wherein
   the first and/or second seal device of the at least one double seal seat is arranged on a circumferential extension on a circumferential side, on an outer side of the sleeve section, or the first and/or second seal device is arranged on a circumferential extension on a circumferential side, on an inner side of the sleeve section, or one of the seal devices of the at least one double seal seat is arranged on a circumferential extension on a circumferential side, on an outer side or an inner side of the sleeve section, and the other seal device of the at least one double seal seat is arranged on a face side of the sleeve section, or one of the seal devices of the at least one double seal seat is arranged on a circumferential extension on a circumferential side, on an inner side of the sleeve section, and the other seal device of the at least one double seal seat is arranged on a circumferential extension on a circumferential side, on an outer side of the sleeve section.

9. The valve according to claim 1, wherein the closure element has a further sleeve section axially adjoining the sleeve section, wherein the further sleeve section has at least one circumferential through-opening, via which an inner side and an outer side of the further sleeve section are in fluid connection.

10. The valve according to claim 1, wherein the actuator
   is constructed as an electromagnetic reluctance actuator with a magnetic field coil, with a magnetically conductive body with an air gap and with an armature, or
   is constructed as an electromagnetic plunger coil actuator with a magnetic field coil and with a permanent magnet.

11. The valve according to claim 10, wherein with a construction as the reluctance actuator, the armature is connected to the closure element.

12. The valve according to claim 10, wherein with a construction as reluctance actuator, the magnetic field coil together with the magnetically conductive body and/or the armature are arranged within the fluid space.

13. The valve according to claim 10, wherein with a construction as the plunger coil actuator, the magnetic field coil and/or the permanent magnet are arranged within the fluid space.

14. The valve according to claim 10, wherein the fluid connection between the fluid inlet or the fluid outlet along the coil axis goes through the center of the magnetic field coil of the reluctance actuator or of the plunger coil actuator.

15. The valve of claim 10, wherein with a construction as the reluctance actuator, the armature is constructed in one piece with the closure element.

16. The valve according to claim 1, wherein the fluid inlet with respect to the sleeve longitudinal axis points axially or radially into the valve housing and/or wherein the fluid outlet with respect to the sleeve longitudinal axis points axially or radially out from the valve housing.

17. The valve according to claim 1, wherein the ratio is one of the following group: between 6/10 and 99/100, between 100/99 and 10/6, between 100/98 and 10/6, between 100/97 and 10/6, between 100/96 and 10/6, between 100/95 and 10/6, between 100/94 and 10/6, between 100/93 and 10/6, between 100/92 and 10/6, between 100/91 and 10/6, between 10/9 and 10/6, between 100/89 and 10/6, between 100/88 and 10/6, between 100/87 and 10/6, and between 100/85 and 10/6.

18. The valve according to claim 1 wherein the valve is a gas injection valve.

19. A valve comprising:
(a) a closure element having at least one sleeve section, the at least one sleeve section having a longitudinal axis and the at least one sleeve section having a first seal device and a second seal device spaced at a first distance from the first seal device along the longitudinal axis;
(b) a valve housing comprising a fluid inlet, a fluid outlet, and a fluid space enclosed between the fluid inlet and the fluid outlet, the valve housing comprising a first counter-seal device and a second counter-seal device spaced from the first counter-seal device by the first distance; and
(c) an actuator, the actuator having stationary parts and movable parts with respect to the valve housing;
wherein the closure element is movable along the longitudinal axis by the actuator to open and close a fluid connection between the fluid inlet and the fluid outlet;
wherein at least the movable parts and the closure element are arranged entirely within the fluid space;
wherein at least one double-seal seat is formed by the first seal device, the first counter-seal device, the second seal device, and the second counter-seal device;
wherein in order to close the fluid connection, the first seal device is in sealing contact with the first counter-seal device along a first closed sealing line and the second seal device is in sealing contact with the second counter-seal device along a second closed sealing line;
wherein a first area enclosed by the first closed sealing line in projection along the longitudinal axis and a second area enclosed by the second closed sealing line in projection along the longitudinal axis have a ratio between 6/10 and 10/6;
wherein at least two devices of the group of the first seal device, the second seal device, the first counter-seal device and the second counter-seal device comprise a seal produced from an elastic material;
wherein said two seals are independent components from each other, and
wherein the valve has at least two double-seal seats.

20. A valve comprising:
(a) a closure element having at least one sleeve section, the at least one sleeve section having a longitudinal axis and the at least one sleeve section having a first seal device and a second seal device spaced at a first distance from the first seal device along the longitudinal axis;
(b) a valve housing comprising a fluid inlet, a fluid outlet, and a fluid space enclosed between the fluid inlet and the fluid outlet, the valve housing comprising a first counter-seal device and a second counter-seal device spaced from the first counter-seal device by the first distance; and
(c) an actuator, the actuator having stationary parts and movable parts with respect to the valve housing;
wherein the closure element is movable along the longitudinal axis by the actuator to open and close a fluid connection between the fluid inlet and the fluid outlet;
wherein at least the movable parts and the closure element are arranged entirely within the fluid space;
wherein at least one double-seal seat is formed by the first seal device, the first counter-seal device, the second seal device, and the second counter-seal device;
wherein in order to close the fluid connection, the first seal device is in sealing contact with the first counter-seal device along a first closed sealing line and the second seal device is in sealing contact with the second counter-seal device along a second closed sealing line;
wherein a first area enclosed by the first closed sealing line in projection along the longitudinal axis and a second area enclosed by the second closed sealing line in projection along the longitudinal axis have a ratio;

the ratio being one of the following group: between 6/10 and 98/100, between 6/10 and 97/100, between 6/10 and 96/100, between 6/10 and 95/100, between 6/10 and 94/100, between 6/10 and 93/100, between 6/10 and 92/100, between 6/10 and 91/100, between 6/10 and 9/10, between 6/10 and 89/100, between 6/10 and 88/100, between 6/10 and 87/100, and between 6/10 and 85/100;

wherein at least two devices of the group of the first seal device, the second seal device, the first counter-seal device and the second counter-seal device comprise a seal produced from an elastic material;

wherein said two seals are independent components from each other, and wherein the sleeve section, in so far as more than one double-seal seat is present, has between respectively adjacent double-seal seats at least one circumferential through-opening, via which an inner side and an outer side of the sleeve section are in fluid connection.

21. A valve comprising:
(a) a closure element having at least one sleeve section, the at least one sleeve section having a longitudinal axis and the at least one sleeve section having a first seal device and a second seal device spaced at a first distance from the first seal device along the longitudinal axis;
(b) a valve housing comprising a fluid inlet, a fluid outlet, and a fluid space enclosed between the fluid inlet and the fluid outlet, the valve housing comprising a first counter-seal device and a second counter-seal device spaced from the first counter-seal device by the first distance; and
(c) an actuator, the actuator having stationary parts and movable parts with respect to the valve housing;

wherein the closure element is movable along the longitudinal axis by the actuator to open and close a fluid connection between the fluid inlet and the fluid outlet;

wherein at least the movable parts and the closure element are arranged entirely within the fluid space;

wherein at least one double-seal seat is formed by the first seal device, the first counter-seal device, the second seal device, and the second counter-seal device;

wherein in order to close the fluid connection, the first seal device is in sealing contact with the first counter-seal device along a first closed sealing line and the second seal device is in sealing contact with the second counter-seal device along a second closed sealing line;

wherein a first area enclosed by the first closed sealing line in projection along the longitudinal axis and a second area enclosed by the second closed sealing line in projection along the longitudinal axis have a ratio between 6/10 and 10/6;

wherein at least two devices of the group of the first seal device, the second seal device, the first counter-seal device and the second counter-seal device comprise a seal produced from an elastic material;

wherein said two seals are independent components from each other, and wherein the first and/or the second seal device of the at least one double-seal seat and/or the first and/or the second counter-seal device of the at least one double-seal seat have the seal, which is arranged in a groove-shaped depression.

22. The valve according to claim 21, wherein the seal has a sealing lip, which is aligned in flow direction of the fluid connection between the fluid inlet and the fluid outlet.

23. A valve comprising:
(a) a closure element having at least one sleeve section, the at least one sleeve section having a longitudinal axis and the at least one sleeve section having a first seal device and a second seal device spaced at a first distance from the first seal device along the longitudinal axis;
(b) a valve housing comprising a fluid inlet, a fluid outlet, and a fluid space enclosed between the fluid inlet and the fluid outlet, the valve housing comprising a first counter-seal device and a second counter-seal device spaced from the first counter-seal device by the first distance; and
(c) an actuator, the actuator having stationary parts and movable parts with respect to the valve housing;

wherein the closure element is movable along the longitudinal axis by the actuator to open and close a fluid connection between the fluid inlet and the fluid outlet;

wherein at least the movable parts and the closure element are arranged entirely within the fluid space;

wherein at least one double-seal seat is formed by the first seal device, the first counter-seal device, the second seal device, and the second counter-seal device;

wherein in order to close the fluid connection, the first seal device is in sealing contact with the first counter-seal device along a first closed sealing line and the second seal device is in sealing contact with the second counter-seal device along a second closed sealing line;

wherein a first area enclosed by the first closed sealing line in projection along the longitudinal axis and a second area enclosed by the second closed sealing line in projection along the longitudinal axis have a ratio between 6/10 and 10/6;

wherein at least two devices of the group of the first seal device, the second seal device, the first counter-seal device and the second counter-seal device comprise a seal produced from an elastic material;

wherein said two seals are independent components from each other, and wherein the valve has one of the following group: three double-seal seats, four double-seal seats, and five double-seal seats.

* * * * *